United States Patent [19]

Schaeffer

[11] 4,153,210
[45] May 8, 1979

[54] FOOD PROCESSING APPLIANCE

[75] Inventor: Robert L. Schaeffer, LeRoy, N.Y.

[73] Assignee: General Electric Company, New York, N.Y.

[21] Appl. No.: 876,764

[22] Filed: Feb. 10, 1978

Related U.S. Application Data

[63] Continuation of Ser. No. 751,042, Dec. 16, 1976, abandoned.

[51] Int. Cl.² ............................................. B02C 18/12
[52] U.S. Cl. ................................. 241/282.1; 366/314
[58] Field of Search .................. 241/92, 199.12, 282.1, 241/282.2; 366/314, 315

[56] References Cited

U.S. PATENT DOCUMENTS

| 2,552,572 | 5/1951 | Mikina | 241/92 X |
| 2,572,375 | 10/1951 | Oertli | 366/315 |
| 2,723,839 | 11/1955 | Lorenz et al. | 366/314 |
| 3,528,469 | 9/1970 | Mantelet | 241/199.12 |
| 3,596,692 | 8/1971 | Swanke | 241/199.12 |
| 3,809,325 | 5/1974 | Marrie | 241/282.1 X |
| 3,892,365 | 7/1975 | Verdun | 241/282.1 X |

Primary Examiner—Howard N. Goldberg
Attorney, Agent, or Firm—John F. Cullen; George R. Powers; Leonard J. Platt

[57] ABSTRACT

A food processing appliance has a base and removable bowl with a cutter mechanism therein which is supported on and driven from a power unit in the base at selected speeds. The invention provides an improvement of a removable reducing transmission disposed directly in and removably coupled to form and close the bottom wall in the bowl and having a portion extending into the bowl for supporting the cutting mechanism. The transmission is disposed entirely external to the base and is driven from the base whereby the selected removable bowl can only be connected to the base for food processing when the transmission is coupled directly to the bowl.

5 Claims, 3 Drawing Figures

FOOD PROCESSING APPLIANCE

This is a continuation of application Ser. No. 751,042, filed Dec. 16, 1976, now abandoned.

BACKGROUND OF THE INVENTION

1. Field of the Invention

The invention relates to a food processing appliance that may use a conventional high speed blender base by providing the bowl with a reducing transmission directly in the bowl forming a bottom wall of the bowl so the appliance may be used as a low speed food processor automatically created when the bowl is placed in position on the base.

2. Description of the Prior Art

Blenders, food processors, and mixers are well known in the prior art and each operates in its own speed range. Some devices have been created using intermediate transmissions that allow the device to be used at other or lower speeds selected for different processing operations. Usually such devices have required the use of separate attachments and/or separate transmissions in order to change the speed of the power unit for the particular operation. This requires extra parts or parts of greater complexity and, where the device sits on top of a power base, adds to the overall height of the appliance. Typical of such devices is shown in U.S. Pat. No. 2,572,375 for reducing the speed of a blender.

An object of the present invention is to provide an appliance which has flexible use because of the provision of a removable reducing transmission that is part of and forms or completes by closing the bottom of a selected bowl whereby putting the bowl on the device automatically provides the correct cutter speed for the operation desired.

Another object is to provide such a device wherein the arrangement of parts is reduced over the conventional intermediate transmissions which have been used for a long time.

A further object is provision of a detachable or coupled transmission which may be used to complete by closing the bottom wall of any number of selected bowls that have inherent mixing characteristics so the selection of the bowl automatically provides the proper speed of rotation.

A still further object is to provide such an appliance wherein the power unit that drives the bowl containing transmission is disposed at the side of the bowl and transmission to reduce the overall height of the appliance.

SUMMARY OF THE INVENTION

Briefly described, the invention is directed to a food processing appliance having a base and a removable bowl with a cutting mechanism therein supported on and driven from a power unit in the base at multiple selected speeds as in a blender. To this combination, the invention provides an improvement that comprises a reducing detachable transmission that is disposed directly in and coupled to form and close the bottom wall in the bowl, the transmission having a portion extending into the bowl to support suitable cutting mechanism. The transmission is disposed entirely external to the base and is driven from the base with the base power unit preferably disposed at the side of the bowl and transmission whereby the invention ensures that the selected removable bowl is formed by and can only be connected for use in food processing when the transmission is coupled directly to the bowl. In other words, the bowl is not a complete bowl unless the transmission is coupled in place and automatically insures that the device is a food processor when the bowl is in place on the powered blender base.

DESCRIPTION OF THE PREFERRED EMBODIMENT

In the present invention, three general types of food processing appliances are contemplated which normally have inconsistent requirements for different operations. They are a blender, a mixer, and a food processor. The normal blender is a high speed device that does a blender's job of liquifying, fine chopping, etc. and a standard blender rotates at 12,000 to 20,000 r.p.m. The mixer is a slow speed device which whips cream, egg whites, etc. so in effect it is a low speed blender in the 300–1,200 r.p.m. range and the food processor grates or slices vegetables, chops meat, and uses cutters and discs in a wide bowl — it has a large capacity and is very fast. It operates in the 2000 r.p.m. range. The inventive concept herein is taking the blender and making it into two other devices that will adequately perform the inconsistent operations by inserting a reducing transmission external to the power unit and coupling it removably in a bowl bottom to form part of and close the bottom wall of the bowl so the bowl is not a bowl without having the transmission in position. This automatically produces the required food processor or appliance depending on the bowl to which the transmission is secured. Thus, a food processing appliance of great flexibility is provided. For purposes of description, it will be assumed that the power base herein is a standard blender base using a low cost series motor that produces high speed and low torque. The primary purpose is to provide a food processor requiring a low speed, high torque normally requiring an expensive induction motor but enabling the use of the lower cost series motor for processing food as noted above. Multiple speeds may be provided in the conventional manner of tapping the motor field to give any number of steps required but forms no part of the present invention.

Figure 1:
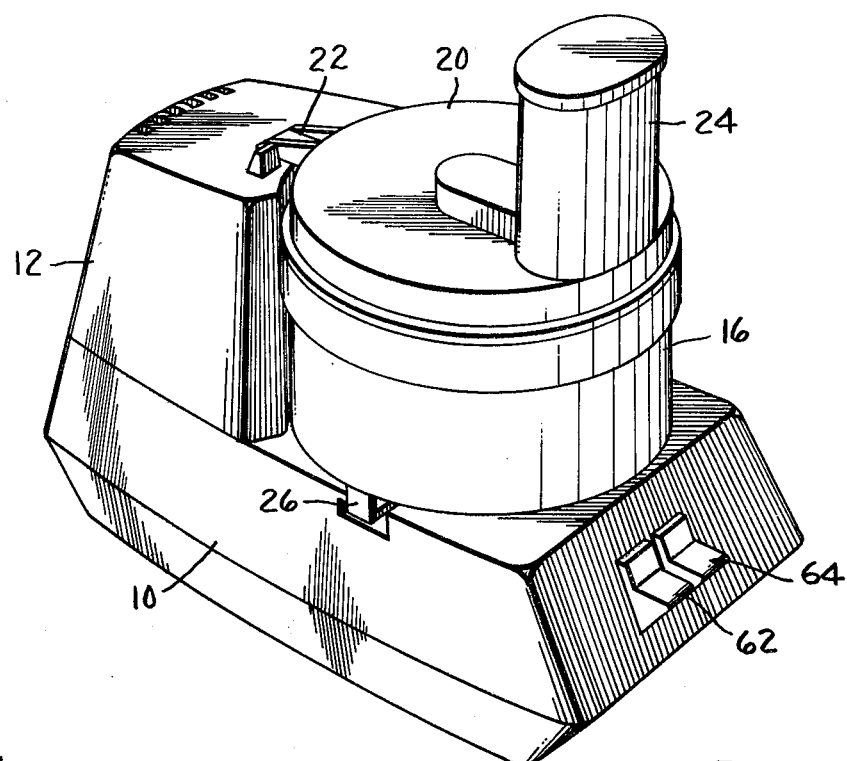
FIG. 1 is a perspective view showing the bowl of the invention in place.

Referring to FIG. 1, there is shown a food processing appliance including a basic blender base 10 which is preferably generally L-shaped having a power unit 12 in the form of a low cost series motor which drives a power shaft 14 (FIG. 2) by a suitable linkage between the power unit and shaft 14 all as well known in the art. Disposed on base 10 is a removable bowl 16 with a cutting mechanism 18 therein. As shown, the bowl 16 is a relatively large bowl with axially displaced cutters 18 of the general type of the food processor as shown in U.S. Pat. No. 3,892,365. As shown herein, the bowl has a cover 20 secured to an interlock 22 and foodstuff enters the bowl through chute 24. The bowl may be locked in position on the base by suitable lugs 26, required by the high torque due to the transmission to be described, and rotated into position on the bowl bottom. Thus, the bowl and cutting mechanism are supported on and the cutting mechanism is driven from the power unit 12 in the base 10 at selected speeds.

Figure 3:
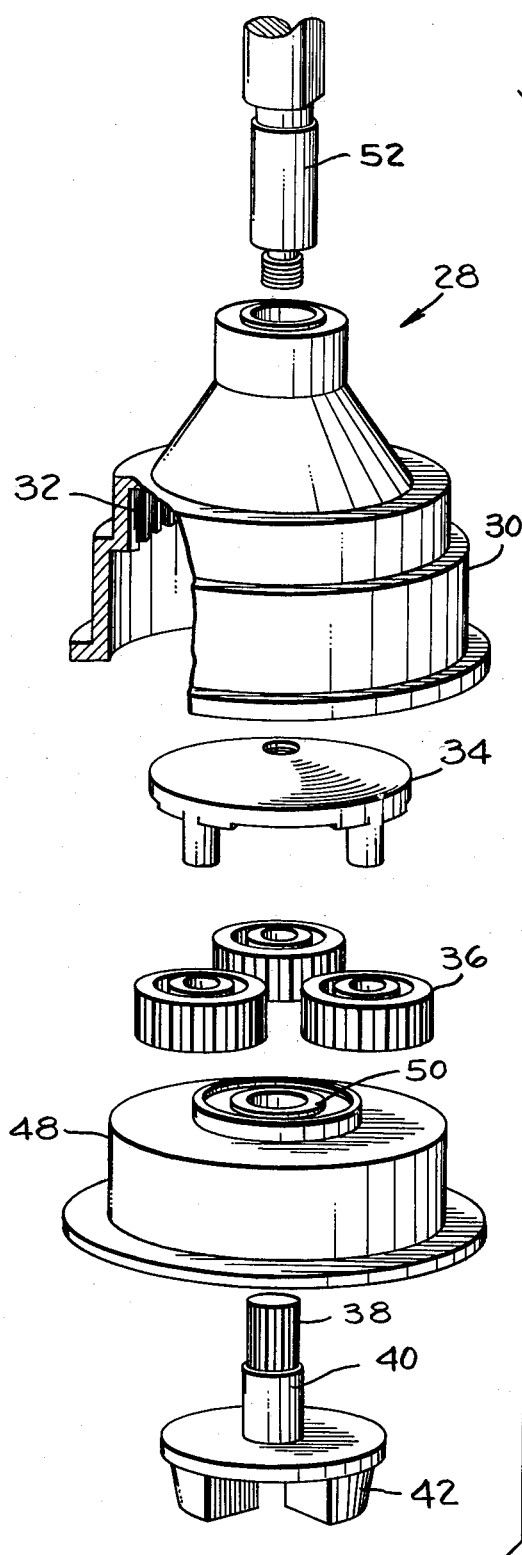
FIG. 3 is a perspective exploded view of the typical transmission.

In order to provide flexibility to this blender base and form a food processor described above and do it with a minimum number of parts, the invention provides a reducing transmission generally indicated at 28 and shown exploded in FIG. 3, which transmission is removably disposed directly in the bottom 29 of the bowl 16 and is coupled to form a bottom wall in the bowl. Except for the reducing transmission this is much like a removable cutter mechanism in a standard blender jar. However, a standard cutting mechanism in a blender jar will not perform a mixing operation and a food processing operation from a blender base since it is much too fast. To achieve this without the usual inter-transmissions and cutters, the invention disposes a removable transmission 28 directly in and coupled to and forming part of and close the bottom wall 29 of the bowl 16 with far fewer parts than normally required of any known blender to convert it into a food processor.

Any suitable transmission may be used providing it is arranged as an integral part of the bottom wall of the bowl so that, in effect, the bowl is not a bowl unless the transmission is in place or, in other words, the bowl would have a large hole in the bottom thereof unless the transmission were in place to complete and close the bottom wall 29. Thus, it is essential that the transmission be in place in the bowl for it to operate and, being in place, it automatically provides the correct reduced speeds from the high speed blender base to create a food processor in the relatively large bowl 16 with its cutting mechanism 18.

Figure 2:
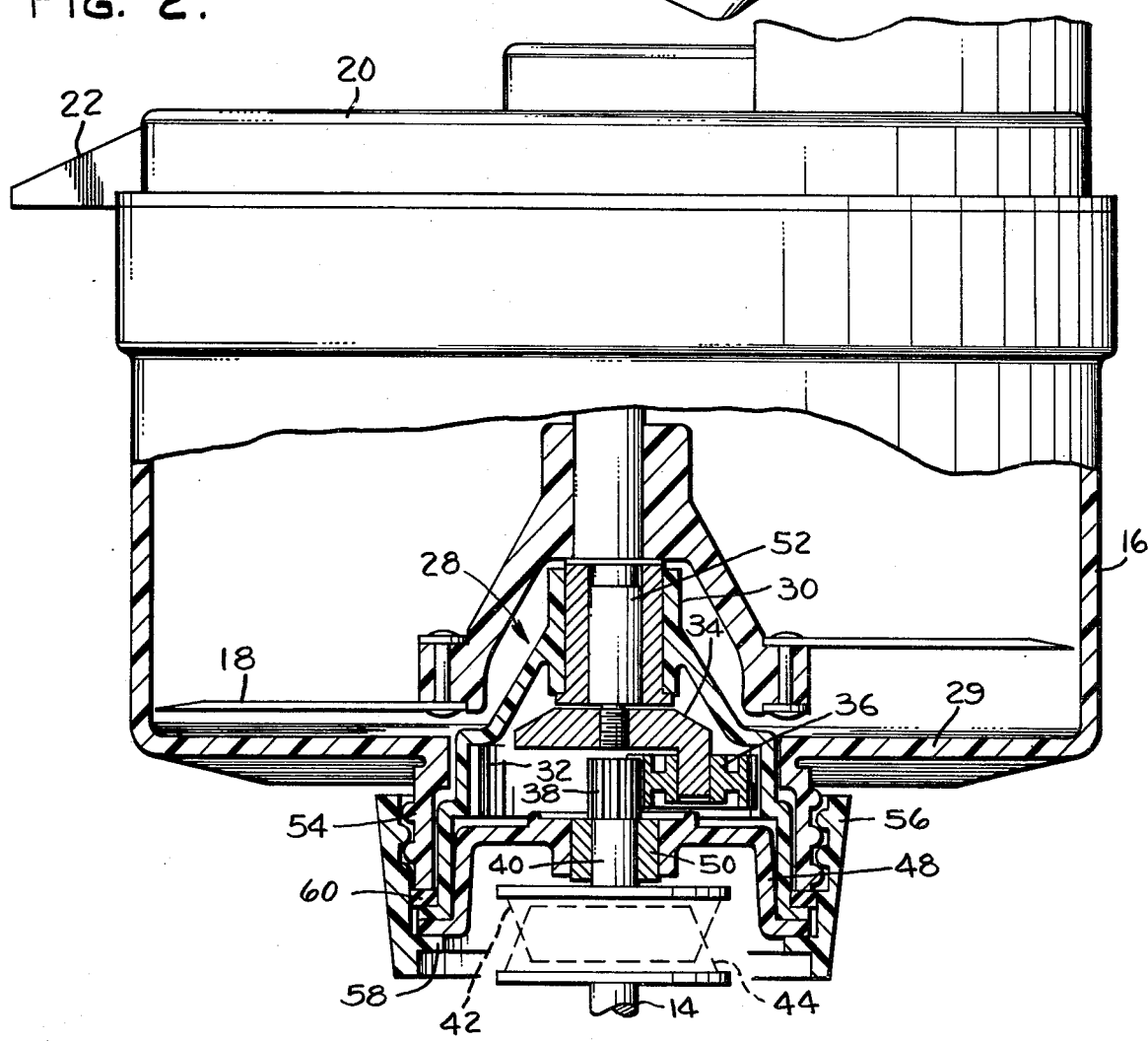
FIG. 2 is a partial elevation partially in section showing a typical removable transmission and its location.

A typical transmission of approximately 8-1 reduction is shown in FIGS. 2 and 3. It comprises a blade support base 30 which extends into the bowl 16 for supporting cutting mechanism 18 thereon as shown in FIG. 2. The support base 30 is provided with an internal gear 32, a drive plate 34, on which are mounted a set of idler gears 36 that rotate around pinion gear 38 forming an extension or connection to drive shaft 40 which is driven from power shaft 14 by interconnecting flexible fingers 42 that mate with corresponding fingers 44 on powershaft 14 in a known manner. The transmission is enclosed by bottom cost 48 having bearing 50 to support the drive shaft 40. In order to drive the supported cutting mechanism 18, cutter blades spindle 52 is secured in drive plate 34 with the whole device producing a reduction such that one revolution of spindle 52 is produced for about eight revolutions of fingers 42, 44, from power shaft 14.

In order to couple the transmission directly into the bottom wall 29 of the bowl 16 to form a major portion of the bottom wall, the bowl may be provided with a threaded extension 54 on which locking sleeve 56 is screwed. Suitable flanges 58 abut like flanges on bottom cover 48 to secure the entire transmission in place. The transmission is sealed in position by suitable gasket 60 between extension 54 and the flanges so that gasket 60 is flattened on tightening locking sleeve 56. Any suitable reducing transmission may be employed providing it is selected to be disposed directly in and coupled to form and complete the bottom wall 29 of bowl 16 by closing it and having a portion 30 to support the cutting mechanism 18 extending into the bowl.

The coupling structure shown may be removed from bowl 16 and placed, with appropriate cutting mechanism, in a different bowl for different food processing steps. Since the bowl is unusable without the transmission in place, because there would be a hole in the bottom it automatically insures that any bowl used on the power base is properly conditioned for the operation to be performed. The particular blender base shown is a single speed device where one button 62 turns the device on or a second button 64 is a momentary switch for momentary or intermittent pulses of power with both being inactivated by interlock 22 when the cover is removed.

Thus, a conventional high speed series blender motor on base 10 may be mounted at the side to produce a slow speed large volume food processor with a reducing transmission 28 disposed as shown. When the bowl and transmission are removed, a suitable blender jar may be substituted for direct drive and the device used as a blender. Any other bowls wherein the transmission forms and completes the bottom wall by closing it may be used to form other processing steps such as mixing with suitable cutters.

The prime advantage of the present device is the flexibility obtainable by the reducing transmission forming part of the bowl bottom wall and completely external of the power base. By building it into the bowl, it is impossible to use the bowl without the proper transmission and there is no guesswork. Further, the use of a transmission in a separate housing in the normal fashion requires a large number of parts whereas the present construction of the transmission in the bowl not only reduces the parts by about a third compared to a separate transmission, it also reduces the overall height of the processor as will be apparent in FIG. 2. Since reaction forces can be quite substantial in this device, especially when chopping meat or hard vegetables, the lower height contributes very substantially to the stability of the processor. Thus, any selected removable bowl is formed by and can only be connected for use in the food processing when the transmission is coupled directly to the bowl to complete and close the bottom wall of the bowl.

While I have hereinbefore described a preferred form of the invention, obvious equivalent variations are possible in light of the above teachings. It is therefore to be understood that, within the scope of the appended claims, the invention may be practiced otherwise than as specifically described, and the claims are intended to cover such equivalent variations.

I claim:

1. A food processing appliance including a power unit in a power base and a removable bowl with a cutting mechanism therein supported on and driven by said power unit in said base through a speed changing transmission, the improvement comprising:

said bowl including an opening in the bottom wall thereof, said speed changing transmission being removable and comprising a support base and including a spindle disposed through said support base for mounting a cutting mechanism thereon, said removable speed changing transmission further extending through said opening and into said bowl, and means for forming a seal between said support base of said speed changing transmission and said bowl whereby the support base of said speed changing transmission completes and closes the bottom wall of said bowl.

2. Apparatus as described in claim 1 wherein said transmission is detachably secured to the bowl to form a coupling with other selected bowls.

3. Apparatus as described in claim 2 wherein said power unit is a high speed series blender motor disposed at the side of said bowl and transmission to reduce the overall appliance height.

4. Apparatus as described in claim 1 wherein said power unit is a high speed blender motor.

5. Apparatus as described in claim 1 wherein said power unit is disposed at the side of said bowl and transmission to reduce the appliance height.

* * * * *